(12) United States Patent
Gum

(10) Patent No.: US 6,363,247 B1
(45) Date of Patent: Mar. 26, 2002

(54) SYSTEM AND METHOD FOR A HANDSET-BASED EMERGENCY AUDIBLE BEACON

(75) Inventor: Arnold J. Gum, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/429,769

(22) Filed: Oct. 28, 1999

(51) Int. Cl.[7] .................... H04M 11/00; H04M 11/04; H04Q 7/20; H04Q 7/00; G08B 1/08
(52) U.S. Cl. .................. 455/404; 455/407; 455/425; 455/456; 455/460; 379/37; 379/38; 340/539
(58) Field of Search .................. 455/400, 404, 455/550, 567, 569, 575, 421, 521, 456, 95, 96, 98, 99; 340/539, 573.1, 321; 379/37, 38, 39

(56) References Cited

U.S. PATENT DOCUMENTS

| | | | |
|---|---|---|---|
| 5,461,365 A | * 10/1995 | Schlager et al. | 340/573 |
| 5,712,900 A | 1/1998 | Maupin et al. | 379/58 |
| 6,044,257 A | * 3/2000 | Boling et al. | 455/404 |
| 6,226,510 B1 | * 5/2001 | Boling et al. | 455/404 |

FOREIGN PATENT DOCUMENTS

| | | | |
|---|---|---|---|
| DE | 3830655 | 3/1990 | G08B/23/00 |
| GB | 2300996 | 11/1996 | G08B/25/10 |
| WO | 0049829 | 8/2000 | H04Q/7/38 |

* cited by examiner

Primary Examiner—Daniel Hunter
Assistant Examiner—Meless Zewdu
(74) Attorney, Agent, or Firm—Philip Wadsworth; Charles D. Brown; Howard Seo

(57) ABSTRACT

A system and method for aiding emergency service providers in locating an incapacitated individual by use of a wireless communications device. The invention has two major modes of operation based upon whether the line of communication between the handset and call destination is open or closed. If the connection between the handset and the call destination is open, the audible beacon periodically generates a preselected tone through the built-in speaker of the telephone. The audible beacon may be initiated from the call destination location, after there has been an established link between the telephone and the call destination, whether the connection is open or closed. Once the audible beacon is initiated, the stored volume settings of the handset are replaced by the volume settings of the audible beacon system and the preselected tone of a telephone ringer or a beep. The tone remains activated until manually turned off.

10 Claims, 3 Drawing Sheets

SYSTEM AND METHOD FOR A HANDSET-BASED EMERGENCY AUDIBLE BEACON

BACKGROUND OF THE INVENTION

1. Field of the Invention

The present invention relates generally to the field of telecommunications. More specifically, the present invention relates to a system and method for triggering an audible beacon in a portable wireless phone that can be used by emergency service providers to locate individuals.

2. Related Art

In an emergency situation, a prompt response by emergency service providers can make the difference between life and death to an incapacitated individual. The existing wireless 911 systems are able to obtain only a cell-site location and a callback number for the wireless 911 caller. With this type of system, a problem is incurred when an individual is unable to speak, give locator information or respond to a telephone call if the emergency service providers decide to use the callback number. By October 2001, the typical wireless communications system will be able to locate an individual to within 125 meters of accuracy as required by the Enhanced 911 (E911) Phase II provision of a Federal Communications Commission (FCC) mandate for wireless communications.

Most often, locating an individual to within 125 meters only means pinpointing a building location, not an exact physical location of the individual. This can present a problem to rescue workers when the building has multiple floors such as in skyscrapers, office buildings, or high rise apartment dwellings. With the existing location systems, the rescue workers have to search from room-to-room to locate an incapacitated individual in such a building. To perform a search using the room-to-room method is quite time consuming and impractical in an emergency situation.

What is needed is a system and method for assisting rescue workers in more quickly locating incapacitated individuals by pinpointing the individual's location much more closely than the E911 Phase II standard of 125 meters of accuracy.

SUMMARY OF THE INVENTION

The present invention is a system and method for aiding emergency service providers in locating an incapacitated individual by use of a wireless communications device. Upon establishment of a call to a predetermined telephone number, the audio beacon is initiated in the handset of a wireless communications device. If, while the connection between the wireless communication device and the emergency services number is open, there is a detection of a predetermined interruption in audio voice signals being transmitted from the wireless communications device, the audible beacon will periodically emit a tone. The emitted tone assists dispatched rescue workers in more quickly locating distressed individuals by allowing the workers to listen for the tone emanating from the handset of the phone. Upon termination of a call to the emergency services telephone number, the audible beacon is immediately initiated. The audible beacon can also be remotely initiated from the call destination location of the emergency service provider if, for example, it becomes necessary to reinitiate the audible beacon after it has been manually turned off. Once the audible beacon is initiated, the stored volume settings of the handset are overridden by the tone of the beacon system. The tone continues to be activated through the handset until it is manually turned off.

An advantage of the present invention is that the audible beacon allows rescue workers to more quickly locate individuals who may be trapped inside buildings with multiple floors and work spaces by permitting the rescue worker to pinpoint, via the emanation of the audible tone, the office space from which the call may have originated. The previous methods only allowed the rescue worker to determine the building from which the call originated.

Further features and advantages of the invention, as well as the operation of various embodiments of the invention, are described in detail below with reference to the accompanying drawings.

BRIEF DESCRIPTION OF THE FIGURES

The features, objects, and advantages of the present invention will become more apparent from the detailed description set forth below when taken in conjunction with the drawings in which like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is particularly suited for use in communications systems employing standard portable cellular or satellite telephones. However, while the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

The present invention is a system and method for triggering an audible beacon that can be used with a wireless communications device. A primary purpose of the audible beacon system is to provide assistance to emergency service providers in locating individuals who are incapacitated. The present invention accomplishes this by emitting a tone through the speaker of a telephone, which the rescue workers can use to home in on the location of the distressed individual.

Prior to describing the invention in detail, a description of the communications device is provided. The communications device operates as a standard cellular or satellite telephone when a non-emergency service telephone number is dialed. The communications device operates in several modes to trigger an audible beacon when a predetermined telephone number for an emergency service provider is dialed. The predetermined number would typically be an emergency service number that connects directly to fire, police, or medical services. In the United States, the standard emergency service number is "911".

Figure 1:
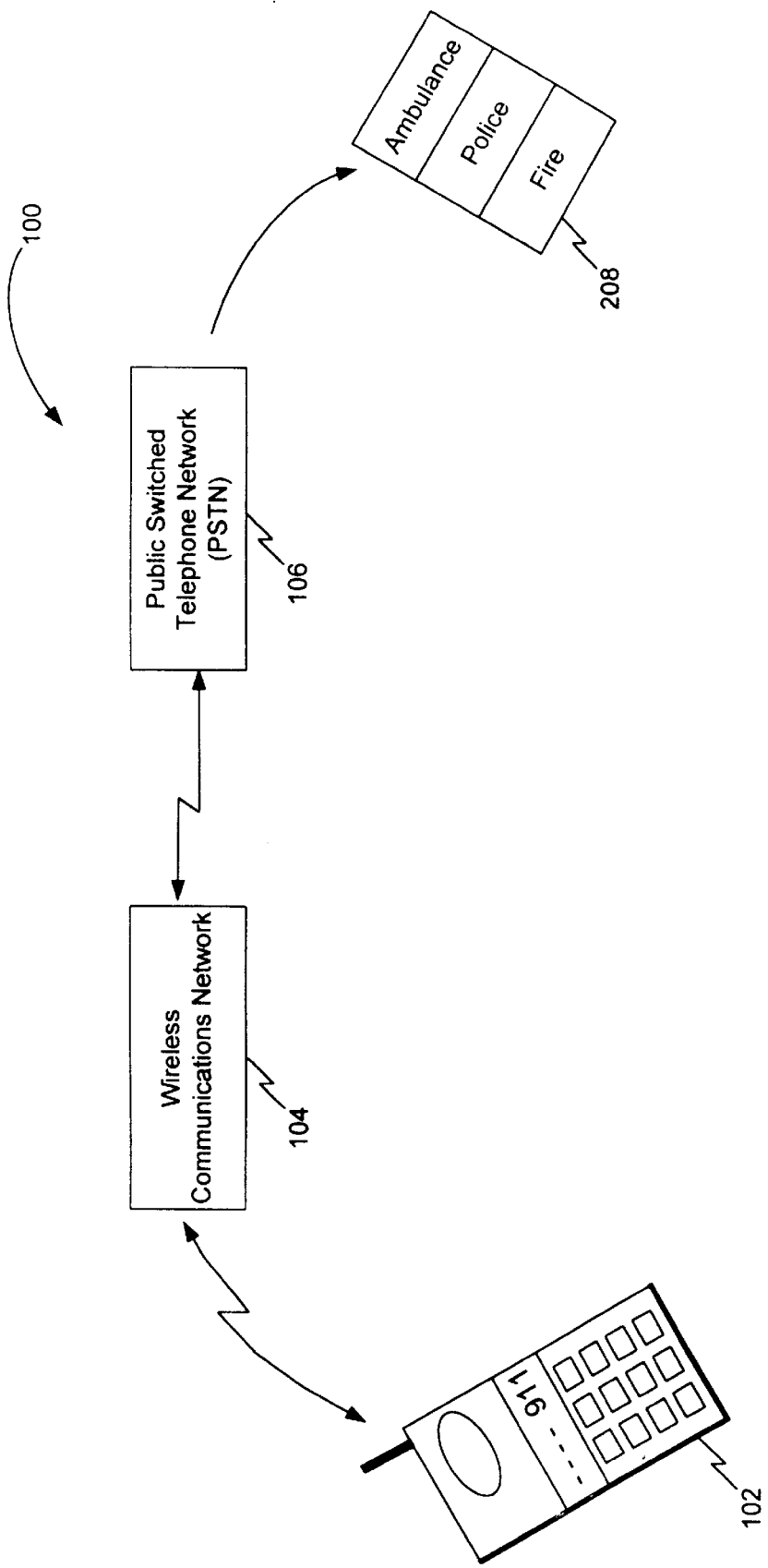
FIG. 1 is a block diagram illustrating the high level operation of the audible beacon system.

FIG. 1 is a block diagram that illustrates the high level operation of the audible beacon system and routing of a call to an emergency service provider. The audible beacon system comprises a wireless communications device 102, a wireless communications network 104, a public switched telephone network (PSTN) 106, and an emergency provider 108. In one embodiment, wireless communications device 102 is a standard cellular telephone operating over a terrestrial cellular network. In an alternative embodiment, device 102 may be a satellite phone operating over a satellite communications network.

When a call to a predetermined telephone number is placed from telephone 102, the signal is sent to wireless communications network 104. In accordance with the E911 Phase II FCC provision, the wireless communications network 104 automatically requests a position fix coordinate from telephone 102. Telephone 102 responds with the appropriate position fix, which is then forwarded by wireless communications network 104 and PSTN 106 to emergency service provider 108. The position fix information will locate phone 102 (and caller) within a radius of about 125 meters.

Figure 2:
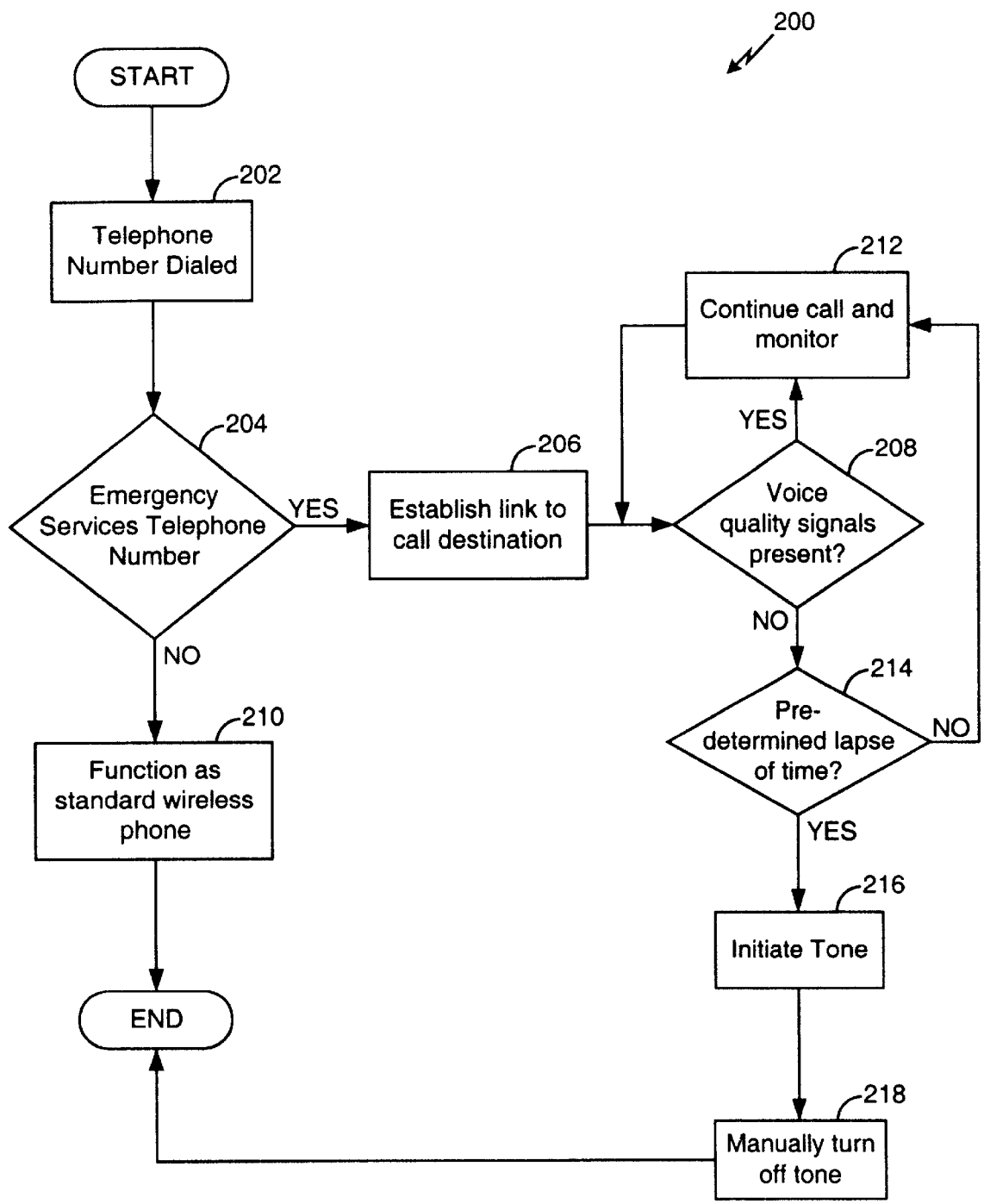
FIG. 2 is a detailed flow diagram illustrating the method for periodically triggering the audible beacon system when there is a cessation of audible signals transmitted from the communications device.

FIG. 2 represents a detailed flow diagram of the method of the invention for periodically triggering the audible beacon system when there is a cessation of audible signals transmitted from the communications device. The process begins with step 202.

In step 202, a telephone number is entered into telephone 102. In step 204, the determination of whether the telephone number dialed is an emergency services number is made. If the telephone number dialed is not an emergency services telephone number, then in step 210 the communications device functions as a standard cellular or satellite phone.

If at decision step 204, the telephone number dialed is determined to be an emergency services telephone number (for example, "911"), a link is established at step 206 between telephone 102 and the call destination. In step 208, the determination of whether voice quality audio signals are being transmitted is made. As long as voice quality signals are present, the telephone call to the call destination continues normally and is monitored at step 212 for the presence of voice quality audio signals.

If at decision step 208 voice quality signals are not detected to be present, then a timer is started to count down a preset period in step 214. If the lapse of voice quality audio signals continues for the duration of the preset countdown period, then in step 216, the audible beacon is initiated to emit a selected phone ringer or beeping tone through the speaker of the telephone 102. If at decision step 214, the lapse of voice quality audio signals does not continue for the duration of the preset time period, then the call will continue to be monitored in step 212. The tone continues to be emitted from the speaker until step 218, when the tone is manually turned off at telephone 102.

Figure 3:
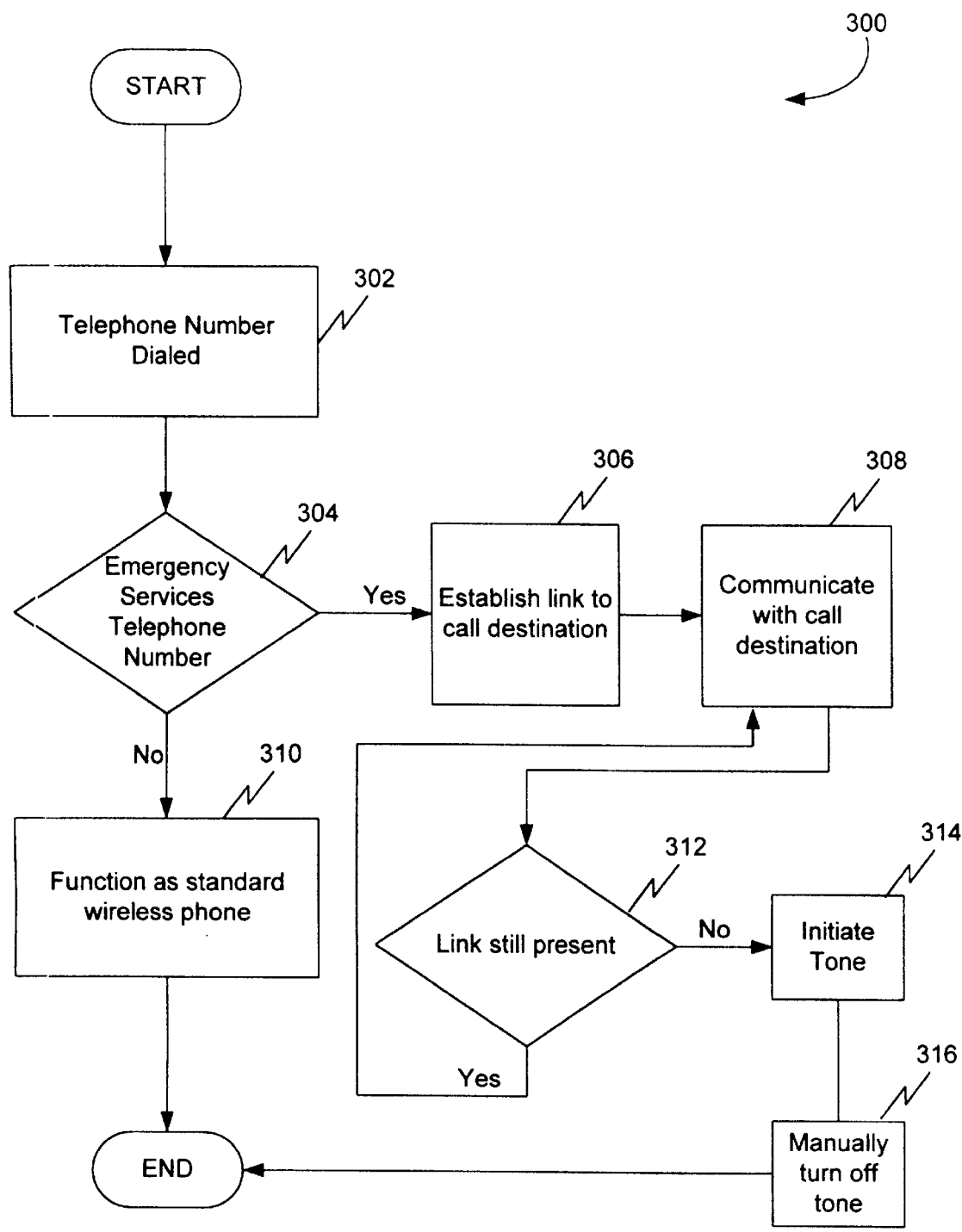
FIG. 3 is a detailed flow diagram illustrating the method for triggering the audible beacon system upon the termination of a call to a predetermined telephone number.

FIG. 3 represents a detailed flow diagram of the method for triggering the audible beacon system upon the termination of a call to a predetermined telephone number. The process begins with step 302.

In step 302, a telephone number is entered into telephone 102. In step 304, the determination of whether the telephone number dialed is an emergency services number is made. If the telephone number dialed is not an emergency services telephone number, then in step 310 the communications device functions as a standard cellular or satellite phone.

If at decision step 304, the telephone number dialed is determined to be an emergency services telephone number (for example, "911"), a link is established at step 306 between telephone 102 and the call destination. In step 308, the line of communication between telephone 102 and the call destination remains open so that the incapacitated individual can converse with the call destination personnel. In step 312, the determination of whether the link is still present is made. As long as the link between telephone 102 and the call destination remain open, the call continues as normal. If in step 312, the link between telephone 102 and the call destination is terminated, the audible tone is triggered to emit a selected phone ringer or beeping tone through the speaker of telephone 102. In step 316, the tone continues to be emitted from the speaker until manually turned off at telephone 102.

Conclusion

While the present invention is described in terms of the handset of a standard cellular or satellite telephone, the present invention is also applicable to other wireless communications devices with a built in speaker. The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. In a wireless communications device, a handset based emergency audible beacon system, comprising:

means for initiating the generation of an audible beacon in said handset following the establishment of a call to a predetermined telephone number representing a call destination location; and means for periodically generating said audible beacon upon the detection of a cessation, after a predetermined time period, of audio signals being transmitted from the handset to said predetermined telephone number.

2. In a wireless communications device, a handset based emergency audible beacon system, comprising:

means for initiating the generation of an audible beacon in said handset following the establishment of a call to a predetermined telephone number representing a call destination location; and means for generating said audible beacon upon the termination of said call.

3. An audible beacon system according to claim 1, wherein:

said means for initiating the generation of said audible beacon is located in said handset.

4. An audible beacon system according to claim 3, further comprising:

means for selecting one of a phone ringer and a beep tone as said audible beacon; and means for over-riding volume settings on said handset when the audible beacon system is initiated.

5. An audible beacon system according to claim 1, wherein:

said means for initiating the generation of said audible beacon is located at said call destination location; and further comprising:

means at said call destination location for remotely initiating the generation of said audible beacon at the handset.

6. An audible beacon system according to claim 5, further comprising:

means for over-riding volume settings on said handset when the emergency audible beacon system is initiated.

7. An audible beacon system according to claim 1, further comprising:

means for emitting said periodic audible beacon through a speaker in said handset.

8. A method for triggering an audible beacon system to aid emergency service providers in locating an incapacitated individual by use of a wireless communications system handset, comprising the steps of:

(a) initiating the generation of an audible beacon in said handset following the establishment of a call to a predetermined telephone number representing a call destination location; and (b) generating said audible beacon upon the detection of a cessation, for a predetermined time period, of voice quality signals being transmitted from the handset to said predetermined number.

9. The method of claim 8, wherein step (b) further comprises the steps of:

monitoring the established call to said predetermined telephone number to detect voice quality audio signals; and detecting a cessation of voice quality signal for said predetermined time period.

10. A method for triggering an audible beacon system to aid emergency service providers in locating an incapacitated individual by use of a handset, comprising the step of:

(a) initiating the generation of an audible beacon in said handset following the establishment of a call to a predetermined telephone number representing a call destination location; and (b) generating said audible beacon upon the termination of said call.

\* \* \* \* \*